United States Patent
Meyers et al.

(10) Patent No.: US 7,868,817 B2
(45) Date of Patent: Jan. 11, 2011

(54) RADAR SYSTEM FOR OBSTACLE AVOIDANCE

(75) Inventors: David W. Meyers, Brooklyn Park, MN (US); Long Bui, Palos Verde Estates, CA (US); Yi-Chi Shih, Palos Verde Estates, CA (US)

(73) Assignee: Honeywell International Inc., Morristown, NJ (US)

( * ) Notice: Subject to any disclaimer, the term of this patent is extended or adjusted under 35 U.S.C. 154(b) by 0 days.

(21) Appl. No.: 12/245,334

(22) Filed: Oct. 3, 2008

(65) Prior Publication Data

US 2010/0085235 A1   Apr. 8, 2010

(51) Int. Cl.
  *G01S 13/00* (2006.01)
  *G01S 13/08* (2006.01)
(52) U.S. Cl. .......... 342/123; 342/36; 342/118; 342/127
(58) Field of Classification Search .......... 342/61, 342/63–65, 75, 76, 118, 123, 127
  See application file for complete search history.

(56) References Cited

U.S. PATENT DOCUMENTS

| | | | |
|---|---|---|---|
| 3,114,147 A * | 12/1963 | Kuecken | 342/29 |
| 3,728,727 A * | 4/1973 | Botwin et al. | 342/156 |
| 3,961,321 A | 6/1976 | Moss | |
| 3,971,020 A * | 7/1976 | Howard | 342/129 |
| 3,986,182 A | 10/1976 | Hackett | |
| 4,027,307 A | 5/1977 | Litchford | |
| 4,150,378 A * | 4/1979 | Barton | 342/107 |
| 4,158,840 A * | 6/1979 | Schwab | 342/52 |
| 4,319,242 A | 3/1982 | Lewis | |

(Continued)

FOREIGN PATENT DOCUMENTS

DE   3740142   6/1989

(Continued)

OTHER PUBLICATIONS

Sarabandi, Kamal, "Millimeter-Wave Radar Phenomenology of Power Lines and a Polarimetric Detection Algorithm", "IEEE Transactions on Antennas and Propagation", Dec. 1999, pp. 1807-, vol. 47, No. 12, Publisher: IEEE, Published in: US.

(Continued)

*Primary Examiner*—Thomas H Tarcza
*Assistant Examiner*—Peter Bythrow
(74) *Attorney, Agent, or Firm*—Fogg & Powers LLC (57) ABSTRACT

A radar system comprises a transmitter antenna configured to transmit a radio frequency (RF) signal, a first receiver antenna, and a second receiver antenna. Each of the first and second receiver antennas are configured to receive a reflection of the RF signal, wherein the first and second receiver antennas are synchronized and separated by a vertical distance. The radar system also comprises radar processing circuitry configured to control transmission of the RF signal from the transmitter antenna and to determine an elevation of an object reflecting the RF signal based on the phase difference between the reflected RF signal received by the first receiver antenna and the reflected RF signal received by the second receiver antenna; wherein the transmit antenna, first receiver antenna, and second receiver antenna are operable to continuously rotate 360 degrees along an azimuth angle without rotating along an elevation angle.

20 Claims, 5 Drawing Sheets

U.S. PATENT DOCUMENTS

| | | | |
|---|---|---|---|
| 4,339,755 A * | 7/1982 | Wright | 342/458 |
| 4,403,220 A * | 9/1983 | Donovan | 342/29 |
| 4,442,431 A | 4/1984 | Bleakney | |
| 4,538,150 A * | 8/1985 | Bone, Jr. | 342/174 |
| 4,755,818 A | 7/1988 | Conrad | |
| 4,855,748 A | 8/1989 | Brandao et al. | |
| 5,057,833 A | 10/1991 | Carlson | |
| 5,097,267 A * | 3/1992 | Raviv | 342/58 |
| 5,111,210 A | 5/1992 | Morse | |
| 5,296,909 A * | 3/1994 | Fazi et al. | 356/4.01 |
| 5,321,489 A | 6/1994 | Defour et al. | |
| 5,351,032 A * | 9/1994 | Latorre et al. | 340/983 |
| 5,451,957 A | 9/1995 | Klausing | |
| 5,529,138 A | 6/1996 | Shaw et al. | |
| 5,557,282 A * | 9/1996 | Mertens | 342/123 |
| 5,712,640 A | 1/1998 | Andou et al. | |
| 5,717,399 A | 2/1998 | Urabe et al. | |
| 5,940,011 A | 8/1999 | Agravante et al. | |
| 6,054,947 A * | 4/2000 | Kosowsky | 342/191 |
| 6,211,808 B1 | 4/2001 | Rees | |
| 6,400,308 B1 | 6/2002 | Bell et al. | |
| 6,636,177 B1 | 10/2003 | Scholz | |
| 6,727,841 B1 * | 4/2004 | Mitra | 342/25 R |
| 6,738,009 B1 * | 5/2004 | Tsunoda | 342/25 A |
| 6,822,612 B2 | 11/2004 | Takimoto et al. | |
| 6,856,279 B2 * | 2/2005 | Hager et al. | 342/147 |
| 6,933,900 B2 | 8/2005 | Kitamori et al. | |
| 6,987,492 B1 * | 1/2006 | Buchanan et al. | 343/882 |
| 7,038,615 B2 * | 5/2006 | Brookner | 342/74 |
| 7,167,126 B2 * | 1/2007 | Wittenberg et al. | 342/123 |
| 7,307,579 B2 | 12/2007 | Rees et al. | |
| 7,379,017 B2 * | 5/2008 | Dwelly et al. | 342/159 |
| 7,443,334 B2 | 10/2008 | Rees et al. | |
| 7,598,646 B2 * | 10/2009 | Cleveland | 310/156.43 |
| 7,692,575 B2 | 4/2010 | Nishimura | |
| 2005/0253748 A1 * | 11/2005 | Brookner | 342/74 |
| 2006/0145913 A1 * | 7/2006 | Kaltschmidt et al. | 342/29 |
| 2007/0018882 A1 * | 1/2007 | Manoogian et al. | 342/80 |
| 2007/0152814 A1 * | 7/2007 | Stefani | 340/539.22 |
| 2007/0252748 A1 | 11/2007 | Rees et al. | |
| 2008/0055149 A1 | 3/2008 | Rees et al. | |
| 2008/0169962 A1 | 7/2008 | Rees et al. | |
| 2008/0266171 A1 * | 10/2008 | Weber et al. | 342/123 |

FOREIGN PATENT DOCUMENTS

EP          1391748          2/2004

OTHER PUBLICATIONS

European Patent Office, "European Search Report", Nov. 4, 2009, Published in: EP.

* cited by examiner

RADAR SYSTEM FOR OBSTACLE AVOIDANCE

CROSS-REFERENCE TO RELATED APPLICATIONS

This application is related to co-pending U.S. patent application Ser. No. 12/245,593, filed on even date herewith and entitled "Multi-Sector Radar System", hereby incorporated herein by reference, and referred to herein as the "'378 Application".

BACKGROUND

Unmanned-aircraft Systems (UAS) flying under the National Airspace System (NAS) need to operate with the same obstacle detection and avoidance capabilities as a piloted vehicle. In particular, UASs operate under the same instrument flight rules for manned vehicles as Instrument Meteorological Conditions (IMC) and Visual Meteorological Conditions (VMC) allow under the NAS. Hence, UASs must possess equivalent sensing and reaction performance capabilities of piloted vehicles.

One technique of providing a necessary field of view (FOV) for a UAS is to use a two-gimbaled radar system. A two-gimbaled radar system rotates along the azimuth angle and the elevation angle in a raster scan motion. However, this raster scan motion causes delay in the update rate. In particular, at each end of the field of view, the gimbaled radar system slows, comes to a stop, and begins moving in the opposite direction at a new elevation angle. Delay in the update rate can result in a delayed reaction to obstacles in the vehicles path.

For the reasons stated above and for other reasons which shall become apparent to one of ordinary skill in the art upon reading and studying the present application, there is a need in the art for an improved radar system with a faster update rate.

SUMMARY

The above mentioned problems and other problems are resolved by the embodiments described herein and will be understood by reading and studying the following specification.

In one embodiment a radar system is provided. The radar system comprises a transmitter antenna configured to transmit a radio frequency (RF) signal, a first receiver antenna, and a second receiver antenna. Each of the first and second receiver antennas are configured to receive a reflection of the RF signal, wherein the first and second receiver antennas are synchronized and separated by a vertical distance. The radar system also comprises radar processing circuitry configured to control transmission of the RF signal from the transmitter antenna and to determine an elevation of an object reflecting the RF signal based on the phase difference between the reflected RF signal received by the first receiver antenna and the reflected RF signal received by the second receiver antenna; wherein the transmit antenna, first receiver antenna, and second receiver antenna are operable to continuously rotate 360 degrees along an azimuth angle without rotating along an elevation angle.

DRAWINGS

Understanding that the drawings depict only exemplary embodiments and are not, therefore, to be considered limiting in scope, the embodiments will be described with additional specificity and detail through the use of the accompanying drawings, in which.

In accordance with common practice, the various described features are not drawn to scale but are drawn to emphasize specific features relevant to the embodiments described herein. Like reference numbers and designations in the various drawings indicate like elements.

DETAILED DESCRIPTION

In the following detailed description, reference is made to the accompanying drawings that form a part hereof, and in which is shown by way of illustration specific illustrative embodiments in which the invention may be practiced. These embodiments are described in sufficient detail to enable those skilled in the art to practice the invention, and it is to be understood that other embodiments may be utilized and that logical, mechanical, and electrical changes may be made without departing from the scope of the embodiments described herein. Furthermore, the method presented in the drawing figures or the specification is not to be construed as limiting the order in which the individual steps may be performed. The following detailed description is, therefore, not to be taken in a limiting sense.

Figure 1:
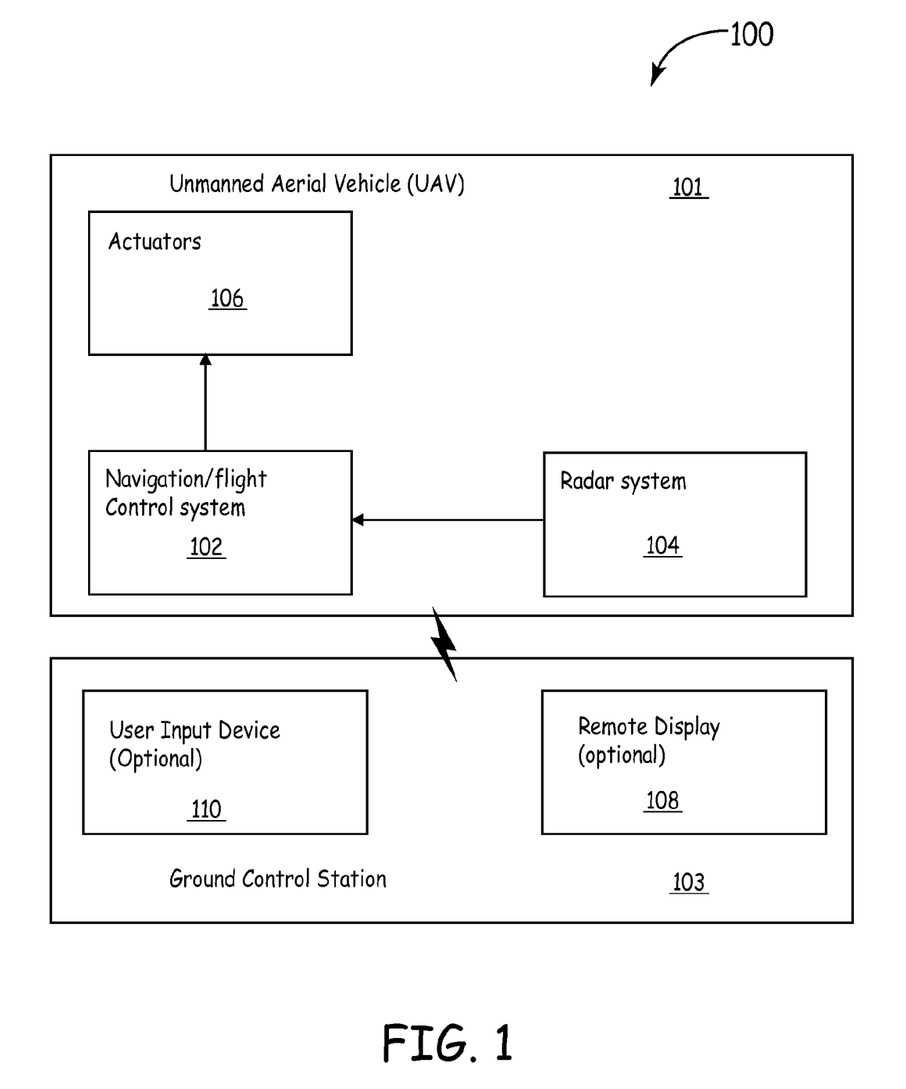
FIG. 1 is a block diagram depicting one embodiment of an unmanned-aircraft system.
Figure 3:
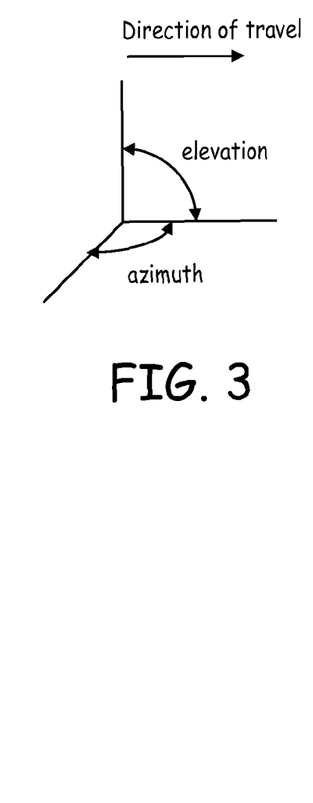
FIG. 3 is a diagram of a coordinate system.

FIG. 1 is a block diagram depicting one embodiment of an unmanned aircraft system (UAS) 100. UAS 100 includes an unmanned aerial vehicle (UAV) 101 and optionally ground control station 103. UAV 101 includes a navigation system 102 and a radar system 104. Radar system 104 detects the presence of obstacles near the unmanned vehicle 100. In particular, radar system 104 continuously rotates 360 degrees along the azimuth angle without rotating along the elevation angle. As used herein, the azimuth angle refers to an angle about an axis perpendicular to the direction of travel and in a plane parallel to the direction of travel, where the direction of travel is at 0 degrees, as depicted in FIG. 3. Hence, the update rate for radar system 104 is faster than two-gimbaled radar systems which move in a raster scan motion. The improvement in update rate results from not slowing to change direction and not rotating along the elevation angle.

Radar system 104 provides the obstacle data to navigation system 102. Navigation system 102 provides control signals to actuators 106 which control operation of actuators 106 in order to avoid detected obstacles. For example, actuators 106 include, but are not limited to, wing flaps and throttle in an aerial vehicle. Navigation system 102 adjusts the heading and speed of vehicle 100 via the actuators 106 to avoid detected obstacles.

In addition, in some embodiments, radar system 104 provides the obstacle data to a remote display 108 in ground control station 103 via a wireless radio frequency (RF) signal. Remote display 108 is located in a remote location where a user can remotely control the unmanned vehicle. Remote display 108 displays the obstacle data to a remote user located in ground control station 103. The remote user can provide commands to navigation system 102 via a remote user input device 110 which is coupled to the navigation system 102 via an RF signal. In response to the commands received from remote user input device 110, navigation system 102 controls the operation of actuators 106 to avoid the detected obstacles.

Figure 2:
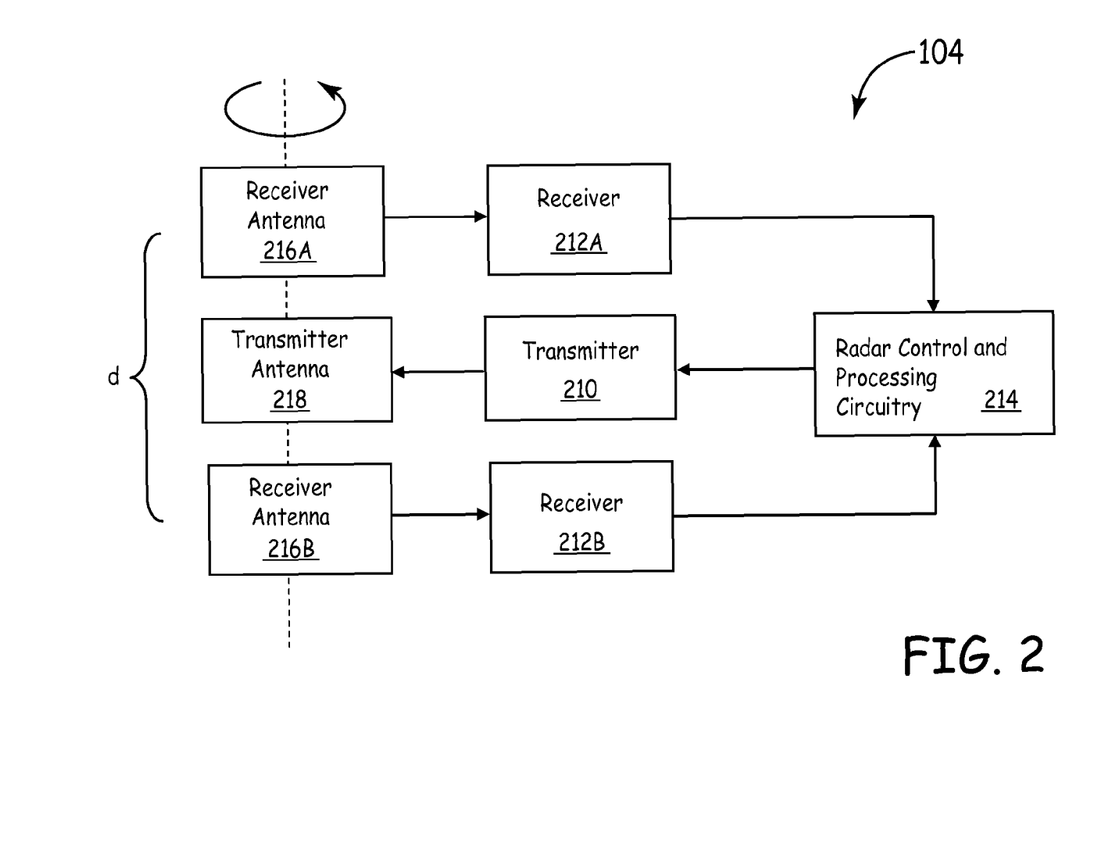
FIG. 2 is a block diagram of one embodiment of a radar system.

FIG. 2 is a block diagram showing further details of one embodiment of a radar system 104. Notably, although radar system 104 is described in relation to a UAS, it is to be understood that in other embodiments, a manned vehicle which is controlled by a local pilot or user is used. In addition, radar system 104 can be implemented in any appropriate type of unmanned vehicle including, but not limited to, unmanned aerial vehicles, unmanned ground vehicles, and unmanned lunar landers, in other embodiments.

Radar system 104 includes a transmitter 210, a transmitter antenna 218, and two receivers 212A and 212B with corresponding receiver antennas 216A and 216B. Transmitter antenna 218 is configured to transmit a radio frequency signal as directed by radar processing circuitry 214 and transmitter 210. In particular, in this embodiment, transmitter antenna 218 is operable to transmit a millimeter wave signal. Each of receiver antennas 216A and 216B are operable to receive reflections of the transmitted millimeter wave signal. In particular, in this embodiment, each of receiver antennas 216A and 216B are implemented as horn antennas.

Furthermore, in this embodiment, radar system 104 is a bi-static radar system. The term "bi-static" refers to a radar system in which the receiver antennas 216A and 216B are separated from transmitter antenna 218. In addition, in this embodiment, the radar system 104 is a bi-static, mono-pulse heterodyne radar system which transmits and receives a frequency modulated continuous wave (FMCW). The term "mono-pulse" refers to a radar system which compares the signal strength of a received reflected signal to itself in determining the location of an object as known to one of skill in the art. However, it is to be understood that other embodiments can be implemented using other types of radar systems and modulation techniques for the detection of objects.

Radar control and processing circuitry 214 analyzes the received reflected signals to detect the presence of an obstacle using techniques known to one of skill in the art. In addition, radar processing circuitry 214 analyzes the phase difference between the reflected signal received by receiver antenna 216A and the reflected signal received by receiver antenna 216B in order to determine the elevation angle of the obstacle with respect to the vehicle bore sight. In particular, the separation distance d between receiver antennas 216A and 216B results in one of the reflected signals traveling a longer path than the other which is the source of the phase difference. Receiver antennas 216A and 216B are synchronized to sample the received signal at substantially the same moment in time. Thus, using the known values of certain variables, such as the wavelength and separation distance, along with the measured phase difference, radar processing circuitry 214 is able to calculate the elevation angle of the obstacle as described in more detail below with respect to FIGS. 4A and 4B.

Figure 5:
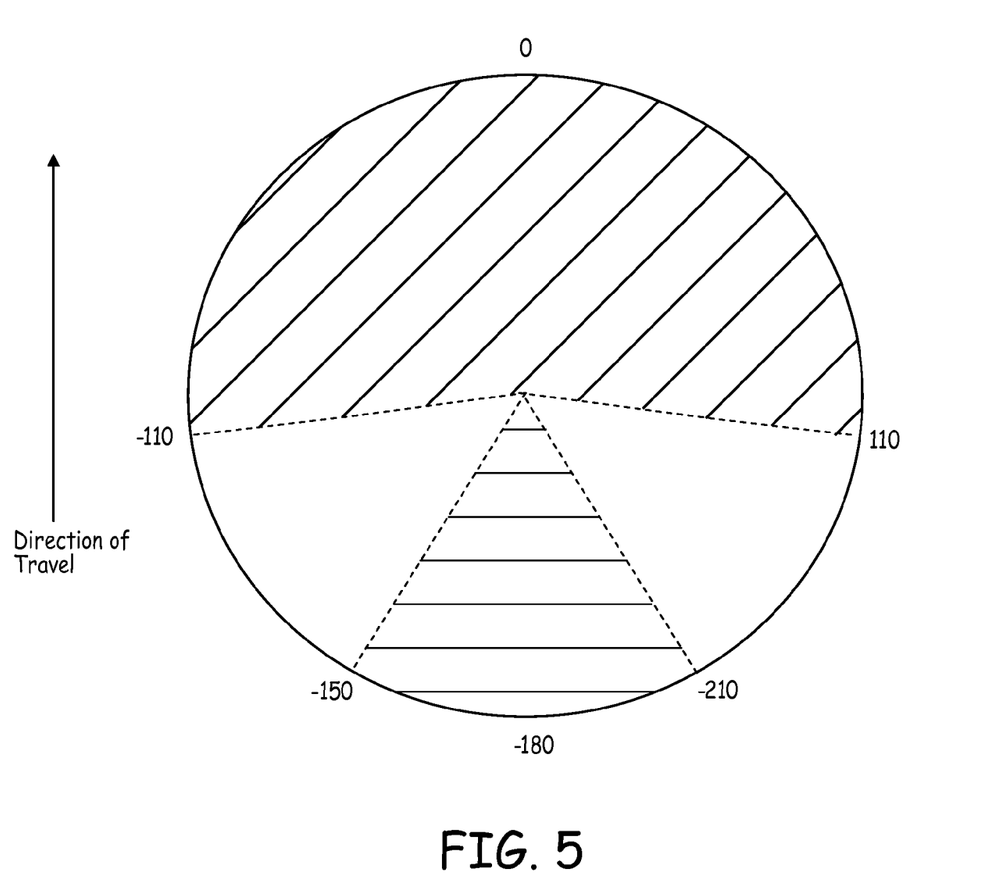
FIG. 5 is a diagram of exemplary regions selected by one embodiment of radar processing circuitry.

Furthermore, as shown in FIG. 2, transmitter antenna 218 and receiver antennas 216A and 216B rotate along the azimuth angle with respect to the direction of travel. Rotation along the azimuth angle enables the radar processing circuitry 214 to determine the azimuth angle of an obstacle with respect to the vehicle. Also, by continuously rotating along the azimuth angle, the radar system does not have to slow, stop, and reverse direction as in the raster-scan type of movement of two-gimbaled radar systems. In addition, by rotating continuously along the azimuth angle, radar processing circuitry 214 is able to electronically select any region (or window) along the 360 degree path for display on a display element such as remote display 108 described above. For example, radar processing circuitry 214 can select a region ranging from −110 degrees to 110 degrees in front of the vehicle (shown as shaded with diagonal lines in FIG. 5), or a region ranging from −150 degrees to −210 degrees behind the vehicle (shown as shaded with horizontal lines in FIG. 5). Any region and size of region can be electronically selected by radar processing circuitry 214. In particular, a user can use an input device, such as user input device 110 described above, to select which region to display. As used herein, a region refers to an area defined by both an azimuth distance and an elevation distance.

Figure 4A:
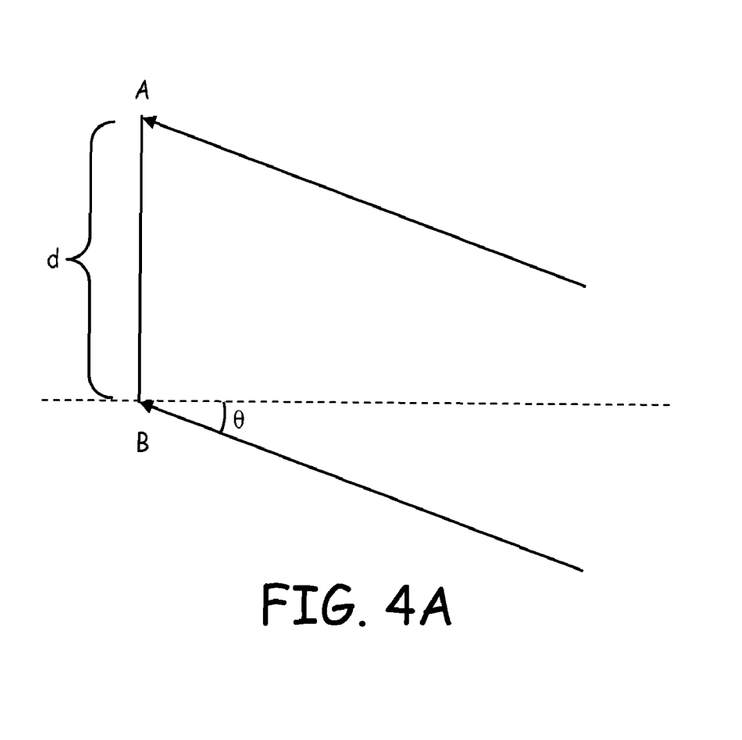
FIGS. 4A-4B depict the relative angle and phase difference of reflected signals received by one embodiment of a radar system.
Figure 4B:
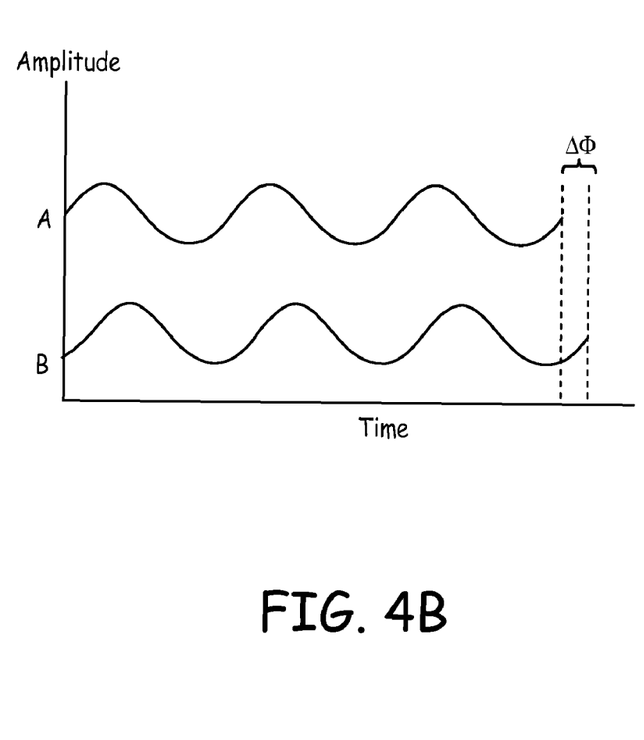

FIGS. 4A-4B depict the relative angle and phase difference of reflected signals received by one embodiment of a radar system. As shown in FIG. 4A, a reflected signal is received at each receiver antenna 216 (labeled A and B in FIGS. 4A and 4B). The elevation angle θ is the angle of incidence at which the reflected signal arrives at receiver antennas A and B. Due to the separation distance, d, between receiver antennas A and B, the reflected signal received at receiver antenna A will be out of phase, by a phase difference ΔΦ, with the reflected signal received at receiver antenna B, as shown in FIG. 4B. The following equation expresses the elevation angle θ in terms of the phase difference ΔΦ and the separation distance d.

$$\theta = \sin^{-1}\left(\frac{\lambda \Delta \phi}{2\pi d}\right)$$

The wavelength λ and separation distance d are both stored by the processing circuitry 214 In addition, processing circuitry 214 measures the phase difference ΔΦ and then calculates the elevation angle θ to determine the vertical position of the detected obstacles. Thus, the embodiments described herein are able to provide both azimuth and elevation angle data without the raster-scan movement of conventional radar systems.

Figure 6:
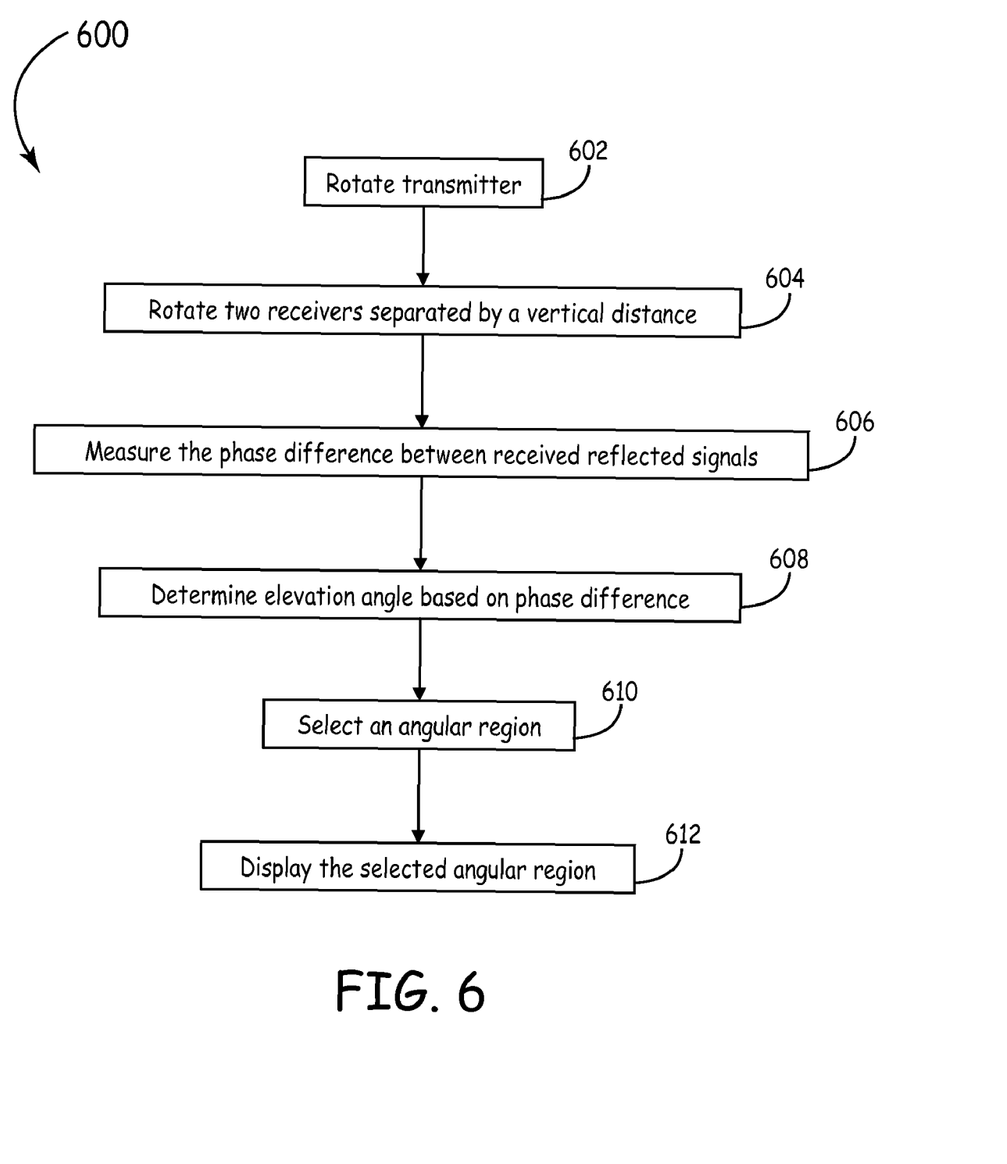
FIG. 6 is a flow chart depicting one embodiment of a method of detecting obstacles with a radar system.

FIG. 6 is a flow chart depicting a method 600 of detecting objects or obstacles near a vehicle. At 602, a transmitter antenna is rotated continuously 360 degrees in the azimuth direction. At 604, two synchronized receiver antennas are also rotated continuously 360 degrees in the azimuth direction. The two receiver antennas are separated by a known vertical distance. At 606, processing circuitry, such as radar processing circuitry 214 above, measures the phase difference between reflected signals received at each of the receiver antennas at substantially the same moment in time.

At 608, the processing circuitry determines the elevation of the object which reflected signals based on the phase difference as described above. At 610, a region (i.e. distance in the azimuth and elevation directions) is selected. For example, in some embodiments a user manually selects the region using a user input device. In other embodiments, the processing circuitry automatically selects the region. For example, the processing circuitry may periodically rotate the region selected. In other embodiments, the processing circuitry is configured to always select a region facing the direction of travel. At 612, radar data corresponding to the selected region is displayed on a display element as described above.

All or some portions of method 600 can be implemented in software instructions tangibly embodied on a computer readable medium and executed by a processing unit such as radar processing circuitry 214. Such computer readable media can be any available media that can be accessed by a general purpose or special purpose computer or processor, or any programmable logic device. Suitable computer readable media may include storage or memory media such as magnetic or optical media, e.g., disk or CD-ROM, volatile or non-volatile media such as RAM (e.g. SDRAM, DDR SDRAM, RDRAM, SRAM, etc.), ROM, EEPROM, flash memory, etc. as well as transmission media such as electrical, electromagnetic, or digital signals, conveyed via a communication medium such as a network and/or a wireless link.

Although specific embodiments have been illustrated and described herein, it will be appreciated by those of ordinary skill in the art that any arrangement, which is calculated to achieve the same purpose, may be substituted for the specific embodiment shown. This application is intended to cover any adaptations or variations of the embodiments described herein. Therefore, it is manifestly intended that this invention be limited only by the claims and the equivalents thereof.

What is claimed is:

1. A radar system comprising:
a transmitter antenna configured to transmit a radio frequency (RF) signal;
a first receiver antenna coupled to a first receiver;
a second receiver antenna coupled to a second receiver; each of the first and second receiver antennas configured to receive a reflection of the RF signal, wherein the first and second receiver antennas are synchronized and separated by a vertical distance; and
radar processing circuitry coupled to the first receiver antenna and the second receiver antenna via the first receiver and the second receiver, respectively, the radar processing circuitry configured to control transmission of the RF signal from the transmitter antenna and to determine an elevation of an object reflecting the RF signal based on the vertical distance separating the first receiver antenna from the second receiver antenna and on a phase difference between the reflected RF signal received by the first receiver antenna and the reflected RF signal received by the second receiver antenna;
wherein the transmit antenna, first receiver antenna, and second receiver antenna are operable to continuously rotate up to 360 degrees along an azimuth angle without rotating along an elevation angle.

2. The radar system of claim 1, wherein the radar processing circuitry is further configured to electronically select a region of radar data for display on a display element.

3. The radar system of claim 2, wherein the display element is coupled to the radar processing circuitry via a wireless connection.

4. The radar system of claim 1, wherein the first and second receiver antennas comprise horn antennas.

5. The radar system of claim 1, wherein the transmitter antenna, the first receiver antenna and the second receiver antenna are operable to use RF signals in the millimeter wave range.

6. The radar system of claim 1, wherein the transmitter is configured to transmit a frequency modulated continuous wave (FMCW) RF signal.

7. An unmanned vehicle system comprising:
an unmanned vehicle, wherein the unmanned vehicle comprises:
at least one actuator operable to adjust motion of an unmanned vehicle;
a radar system operable to detect the presence of objects near the unmanned vehicle; and
a navigation system coupled to the at least one actuator and the radar system, wherein the navigation system is operable to provide control signals to the at least one actuator to adjust the motion of the unmanned vehicle;
wherein the radar system comprises:
a transmitter antenna operable to transmit a radio frequency (RF) signal;
a first receiver antenna coupled to a first receiver;
a second receiver antenna coupled to a second receiver, each of the first and second receiver antennas operable to receive a reflection of the RF signal, wherein the first and second receiver antennas are synchronized and separated by a vertical distance; and
radar processing circuitry coupled to the first receiver antenna and the second receiver antenna via the first receiver and the second receiver, respectively, the radar processing circuitry configured to control transmission of the RF signal from the transmitter and to determine the elevation of an object reflecting the RF signal based on the vertical distance separating the first receiver antenna from the second receiver antenna and on a phase difference between the reflected RF signal received by the first receiver antenna and the reflected RF signal received by the second receiver antenna;
wherein the transmitter antenna, first receiver antenna, and second receiver antenna are operable to continuously rotate up to 360 degrees along an azimuth angle without rotating along an elevation angle.

8. The unmanned vehicle system of claim 7, wherein the unmanned vehicle is one of an unmanned aerial vehicle, an unmanned ground vehicle, and an unmanned lunar lander.

9. The unmanned vehicle system of claim 7, further comprising a ground control station, the ground control station including a display element coupled to the radar system, wherein the radar processing circuitry is further configured to electronically select a region of radar data for display on the display element.

10. The unmanned vehicle system of claim 9, wherein the ground control station further comprising a user input device operable to provide input to at least one of the radar system and the navigation system.

11. The unmanned vehicle system of claim 9, wherein the display element is coupled to the radar processing circuitry via a wireless connection.

12. The unmanned vehicle system of claim 7, wherein the first and second receiver antennas comprise horn antennas.

13. The unmanned vehicle system of claim 7, wherein the transmitter antenna, the first receiver antenna and the second receiver antenna are operable to use signals in the millimeter wave range.

14. The unmanned vehicle system of claim 7, wherein the transmitter antenna is operable to transmit a frequency modulated continuous wave (FMCW) RF signal.

15. A method of detecting obstacles with a radar system, the method comprising:
continuously rotating a transmitter antenna 360 degrees along an azimuth angle without rotating the transmitter antenna along an elevation angle, the transmitter configured to transmit a radio frequency (RF) signal;
continuously rotating two receiver antennas 360 degrees along the azimuth angle without rotating the two receiver antennas along the elevation angle, each receiver configured to receive a reflection of the transmitted RF signal, wherein the two receiver antennas are separated by a vertical distance;
measuring the phase difference between a reflected signal received by one of the two receivers and a reflected signal received substantially simultaneously by the other receiver; and determining the elevation angle of an object which reflected the RF signals based on the measured phase difference.

16. The method of claim 15, further comprising:
selecting a region; and
displaying radar data corresponding to the selected region.

17. The method of claim 16, wherein selecting the region comprises selecting the region manually with a user input device.

18. The method of claim 16, wherein selecting the region comprises selecting the region automatically.

19. The radar system of claim 1, wherein the radar processing circuitry is configured to determine the elevation of an object reflecting the RF signal based on a corresponding elevation angle, wherein the radar processing circuitry is configured to calculate the corresponding elevation angle based on the vertical distance separating the first receiver antenna from the second receiver antenna; the phase difference between the reflected RF signal received by the first receiver antenna and the reflected RF signal received by the second receiver antenna; and a wavelength of the RF signal.

20. The unmanned vehicle system of claim 7, wherein the radar processing circuitry is configured to determine the elevation of an object reflecting the RF signal based on a corresponding elevation angle, wherein the radar processing circuitry is configured to calculate the corresponding elevation angle based on the vertical distance separating the first receiver antenna from the second receiver antenna; the phase difference between the reflected RF signal received by the first receiver antenna and the reflected RF signal received by the second receiver antenna; and a wavelength of the RF signal.

* * * * *